(12) United States Patent
Mohandes et al.

(10) Patent No.: US 9,811,722 B2
(45) Date of Patent: *Nov. 7, 2017

(54) MULTI-CAMERA SPATIAL SIGN LANGUAGE RECOGNITION METHOD AND SYSTEM

(71) Applicant: King Fahd University of Petroleum and Minerals, Dhahran (SA)

(72) Inventors: Mohamed Mohandes, Dhahran (SA); Mohamed Abdelouaheb Deriche, Dhahran (SA); Salihu Oladimeji Aliyu, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 15/488,225

(22) Filed: Apr. 14, 2017

(65) Prior Publication Data

US 2017/0220856 A1    Aug. 3, 2017

Related U.S. Application Data

(63) Continuation of application No. 14/862,305, filed on Sep. 23, 2015, now Pat. No. 9,672,418.

(Continued)

(51) Int. Cl.

| G06K 9/00 | (2006.01) |
|---|---|
| G06F 3/01 | (2006.01) |
| H04N 5/33 | (2006.01) |
| G06K 9/46 | (2006.01) |
| G06K 9/62 | (2006.01) |
| G06T 19/20 | (2011.01) |
| G09B 21/00 | (2006.01) |

(52) U.S. Cl.
CPC .......... *G06K 9/00355* (2013.01); *G06F 3/011* (2013.01); *G06K 9/4604* (2013.01);
(Continued)

(58) Field of Classification Search
USPC .......................................... 382/103, 224–228
See application file for complete search history.

(56) References Cited

U.S. PATENT DOCUMENTS

| 7,184,994 B2 | 2/2007 | Bella |
| 2009/0103780 A1 | 4/2009 | Nishihara |
| 2009/0214117 A1 | 8/2009 | Ma |

(Continued)

FOREIGN PATENT DOCUMENTS

| AU | 2013260700 A1 | 7/2014 |
| CN | 103530619 A | 1/2014 |
| IN | 2447/CHE/2013 | 6/2013 |

OTHER PUBLICATIONS

Assaleh, Khaled, "Recognition of Arabic Sign Language Alphabet Using Polynomial Classifier," 2005, Hindawi Publishing Corporations, Journal on Applied Signal Processing.

(Continued)

*Primary Examiner* — Alex Liew
(74) *Attorney, Agent, or Firm* — Oblon, McClelland, Maier & Neustadt, L.L.P.

(57) ABSTRACT

Systems and methods for sign language recognition are described to include circuitry to detect and track at least one hand and at least one finger of the at least one hand from at least two different locations in a room, generate a 3-dimensional (3D) interaction space based on the at least two different locations, acquire 3D data related to the at least one detected and tracked hand and the at least one detected and tracked finger, extract 3D features associated with the at least one detected and tracked hand and the at least one detected and tracked finger, analyze a relevance metric related to the extracted 3D features, classify at least one pattern from each of the at least two different locations based on a fusion of data outputs by the circuitry, and generate a recognized sign language letter based on the fusion of the data outputs.

17 Claims, 8 Drawing Sheets

Related U.S. Application Data

(60) Provisional application No. 62/113,276, filed on Feb. 6, 2015.

(52) U.S. Cl.
CPC ............ *G06K 9/6267* (2013.01); *G06T 19/20* (2013.01); *G09B 21/009* (2013.01); *H04N 5/33* (2013.01)

(56) References Cited

U.S. PATENT DOCUMENTS

| | | | | |
|---|---|---|---|---|
| 2010/0328201 | A1* | 12/2010 | Marvit | G06F 1/1613 345/156 |
| 2012/0214594 | A1 | 8/2012 | Kirovski | |

OTHER PUBLICATIONS

Jubin Mehta, "Nirma University students use Leap Motion to convert sign language into speech", http://yourstory.com/2014/05/leap-motion/, May 18, 2014, 3 pages.

Tamer Shanableh, et al., "Two Tier Feature Extractions for Recognition of Isolated Arabic Sign Language Using Fisher's Linear Discriminants", ICASSP, 2007, pp. II-501-II-504.

"Inside the Leap Motion AXLR8R: 90 Seconds with MotionSavvy", Leap Motion Developer, http://blog.leapmotion.com/inside-the-leap-motion-axlr8r-90-seconds-with-motionsavvy/, Mar. 31, 2014, 3 pages.

Leigh Ellen Potter, et al., "The Leap Motion controller: A view on sign language", Proceedings of the 25$^{th}$ Australian Computer-Human Interaction Conference: Augmentation, Application, Innovation, Collaboration, 2013, 4 pages.

\* cited by examiner

MULTI-CAMERA SPATIAL SIGN LANGUAGE RECOGNITION METHOD AND SYSTEM

CROSS-REFERENCE TO RELATED APPLICATIONS

This application is a continuation application of Ser. No. 14/862,305, now allowed, having a filing date of Sep. 23, 2015, and claims priority to U.S. Provisional Application No. 62/113,276 having a filing date of Feb. 6, 2015, the entire contents of which are incorporated herein by reference.

BACKGROUND

The present disclosure relates generally to systems and methods for monitoring and recognizing sign language using multiple sensors. More specifically, the present disclosure relates to systems and methods for monitoring and recognizing Arabic sign language using multiple Leap Motion Controller sensors.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present dislosure.

Sign language is important for facilitating communication between hearing impaired and the rest of society. However, very few vocal people know sign language. As such, systems have been developed to translate between spoken and sign languages automatically. Two approaches have traditionally been used for Arabic Sign Language (ArSL): image-based and glove-based systems. The glove-based approach requires signers to wear an electronic sensor glove. The sensors track and detect hands and finger motion by determining the motion of the glove. The drawback of this approach is that the signer has to wear a cumbersome instrument while performing the signs.

Image based systems use image processing techniques to detect and track hands and fingers as well as facial expressions of the signer. A disadvantage of this approach is that the sgementation of the hands and fingers requires extensive computations. The signer may be required to wear colored gloves to simplify the segmentation process. This approach is easier to the signer, however, some restrictions on background and lighting may be needed for better recogition accuracy. Glove-based systems require the user to wear electronic gloves while performing the signs. The glove includes a number of sensors detecting different hand and finger articulations.

As such, there is needed a system for hearing impaired people, that overcomes the disadvantages of the sensor glove and image based systems.

SUMMARY

One exemplary aspect of the present disclosure provides a method for sign language recognition, including detecting and tracking at least one hand and at least one finger of the at least one hand from at least two different locations in a room by at least two different sensors; generating a 3-dimensional (3D) interaction space based on the at least two different sensors; acquiring 3D data related to the at least one detected and tracked hand and the at least one detected and tracked finger; extracting 3D features associated with the at least one detected and tracked hand and the at least one detected and tracked finger; analyzing a relevance metric related to the extracted 3D features; classifying, by an analysis classifier, at least one pattern from each of the at least two different locations based on a fusion of data outputs by circuitry; and generating a recognized sign language letter based on the fusion of the data outputs.

The method further includes wherein the at least two different sensors are Leap Motion Controllers (LMC) and wherein 28 Arabic alphabet signs are performed in the interaction space. Furthermore wherein acquiring data further comprises collecting ten samples for each letter and for each LMC, wherein each sample includes ten captured frames of data for each of the at least one detected and tracked hand and the at least one detected and tracked finger. Additionally, wherein the extracted features associated with the at least one detected and tracked hand and the at least one detected and tracked finger include finger length, finger width, average tip position with respect to x, y, and z-axis, hand sphere radius, palm position with respect to x, y and z-axis, hand pitch, roll and yaw and wherein the relevance metric includes estimating a mean of each feature across the ten frames of each sample.

A further exemplary aspect of the present disclosure includes wherein the data fusion output is performed at the data acquisition level and wherein the data fusion output is performed at the feature extraction level. The data fusion output is performed at the classification level wherein Linear Discriminant analysis (LDA) classifiers are used to receive data from each LMC path. The method further includes wherein LDA classifier output data is combined using a Dempster-Shafer theory of combination applied at a measurement level combination.

Another exemplary aspect of the present disclosure provides a system for sign language recognition including circuitry configured to: detect and track at least one hand and at least one finger of the at least one hand from at least two different locations in a room, generate a 3-dimensional (3D) interaction space based on the at least two different locations, acquire 3D data related to the at least one detected and tracked hand and the at least one detected and tracked finger, extract 3D features associated with the at least one detected and tracked hand and the at least one detected and tracked finger, analyze a relevance metric related to the extracted 3D features, classify at least one pattern from each of the at least two different locations based on a fusion of data outputs by the circuitry, and generate a recognized sign language letter based on the fusion of the data outputs. In one example, a database of letters may be generated such that a word can be formulated out of the generated letters.

The system further includes wherein the detecting and tracking circuitry uses at least two Leap Motion Controllers (LMC) and wherein 28 Arabic alphabet signs are performed in the interaction space. The circuitry is further configured to: collect ten samples for each letter and for each LMC, wherein each sample includes ten captured frames of data for each of the at least one detected and tracked hand and the at least one detected and tracked finger. The extracted features associated with the at least one detected and tracked hand and the at least one detected and tracked finger include finger length, finger width, average tip position with respect to x, y, and z-axis, hand sphere radius, palm position with respect to x, y and z-axis, hand pitch, roll and yaw. The relevance metric includes estimating a mean of each feature across the ten frames of each sample. The data fusion output is performed at the classification level. Furthermore, Linear Discriminant Analysis (LDA) classifiers are used to receive data from each LMC path, wherein LDA classifier output data is combined using a Dempster-Shafer theory of combination applied at a measurement level combination.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1A:
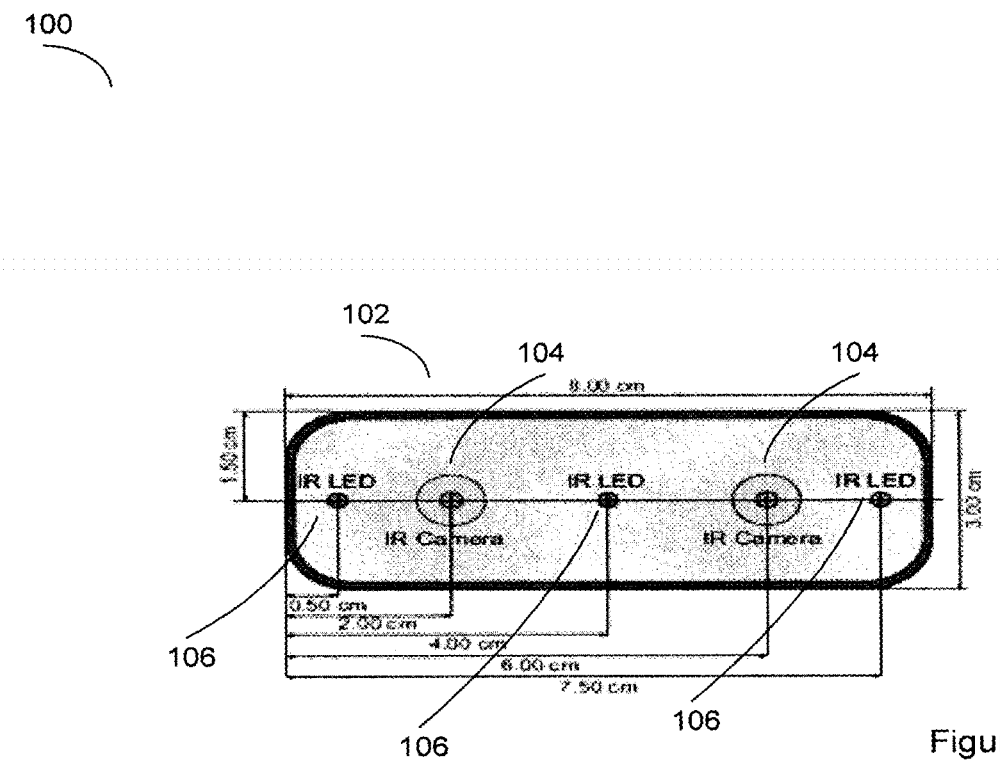
FIG. 1A is a sensor configuration within the sign language recognition system according to an exemplary embodiment.

Referring now to the drawings, wherein like reference numerals designate identical or corresponding parts throughout the several views.

FIG. 1A is a sensor configuration within the sign language recognition system 100 according to an exemplary embodiment.

As one exemplary sensor deployed within the sign language recognition system 100, the Leap Motion Controller (LMC) 102 is a small USB peripheral device which is designed to be placed on a physical desktop, facing upward, using two monochromatic IR cameras 104 and three infrared LEDs 106, the device observes a substantially hemispherical area, to a distance of up to a few meters. Infrared LEDs 106 generate a 3D pattern of dots of IR light and the IR cameras 104 generate almost 300 frames per second of reflected data, which is then sent through the USB cable to the host computer, where it is analyzed by the LMC 102 software. The smaller observation area and higher resolution of the device differentiates the product from other products on the market, such as Microsoft's Knect™ motion controller, which is more suitable for whole-body tracking in a space the size of a living room. The LMC is proven to be used in multiple applications, including, for example, as a navigation tool for websites, using a pinch-to-zoom gestures on maps, high-precision drawing and manipulating complex 3D data visualization.

LMC 102 detects and tracks hands, fingers and finger-like objects reporting discrete position and motion. The LMC field of view is an inverted pyramid of about 8 cubic feet centered on the device. The driver software processes the acquired data and extracts position and other information.

Figure 1B:
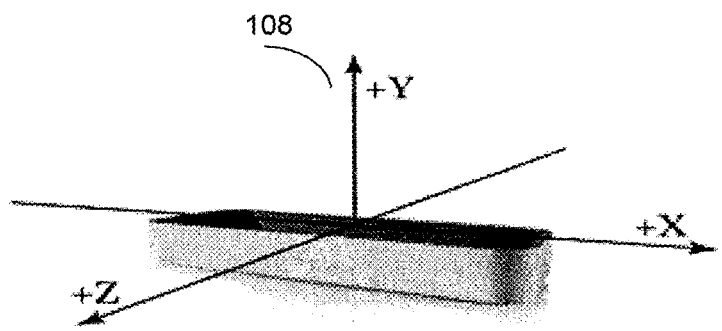
FIG. 1B is a sensor coordinate system configuration according to an exemplary embodiment.

FIG. 1B is a sensor coordinate system configuration according to an exemplary embodiment. LMC 102 employs a right-handed Cartesian coordinate system 108. Values reported are in units of real world millimeters. The center of the device is considered the central point of origin. The x-axis and z-axes lie on the horizontal plane, with the x-axis running parallel to the long edge of LMC 102. The y-axis is vertical, with positive values increasing away from a computer screen (not shown).

As LMC 102 tracks hands and fingers in its field of view, it provides updates as a set, or frames of data. Each frame contains a list of the basic tracking data that describes the overall motion in the scene. When it detects the hands and fingers, LMC software assigns the object a unique tracking ID tag. The ID tag remains the same as long as that object remains visible within the device's field of view. If tracking is lost and regained, the software may assign for it a new ID.

Figure 2A:
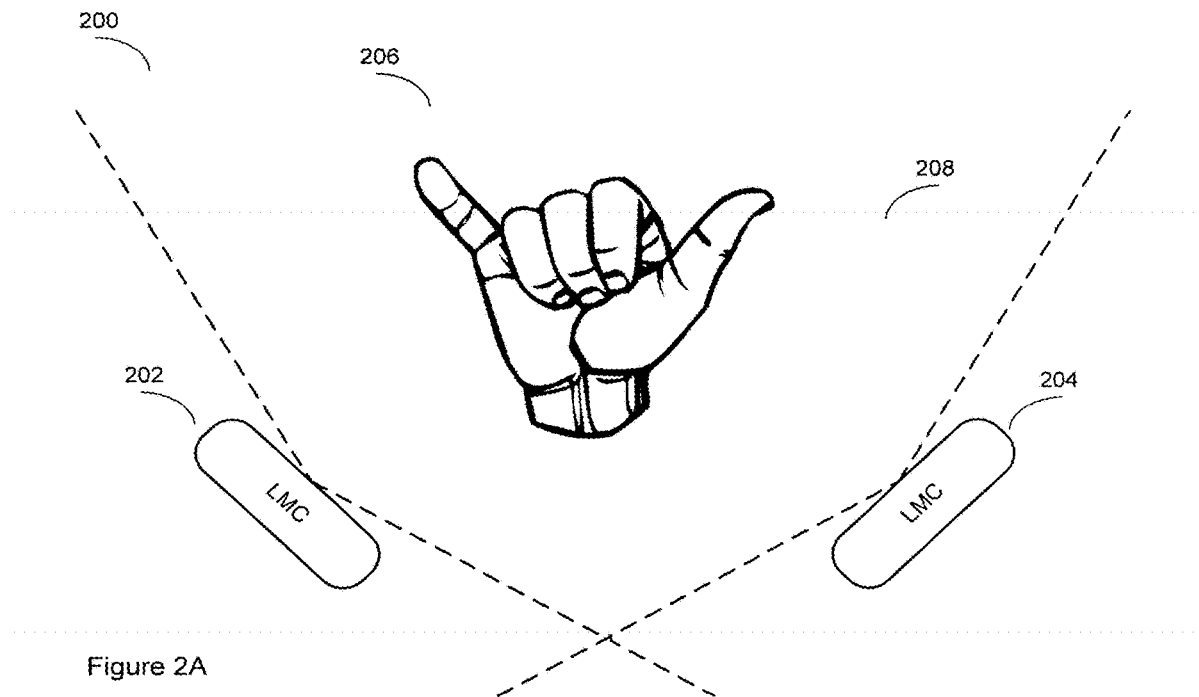
FIG. 2A is a proposed 2-sensor configuration and a generated detection environment within the sign language recognition system according to an exemplary embodiment.
Figure 2B:
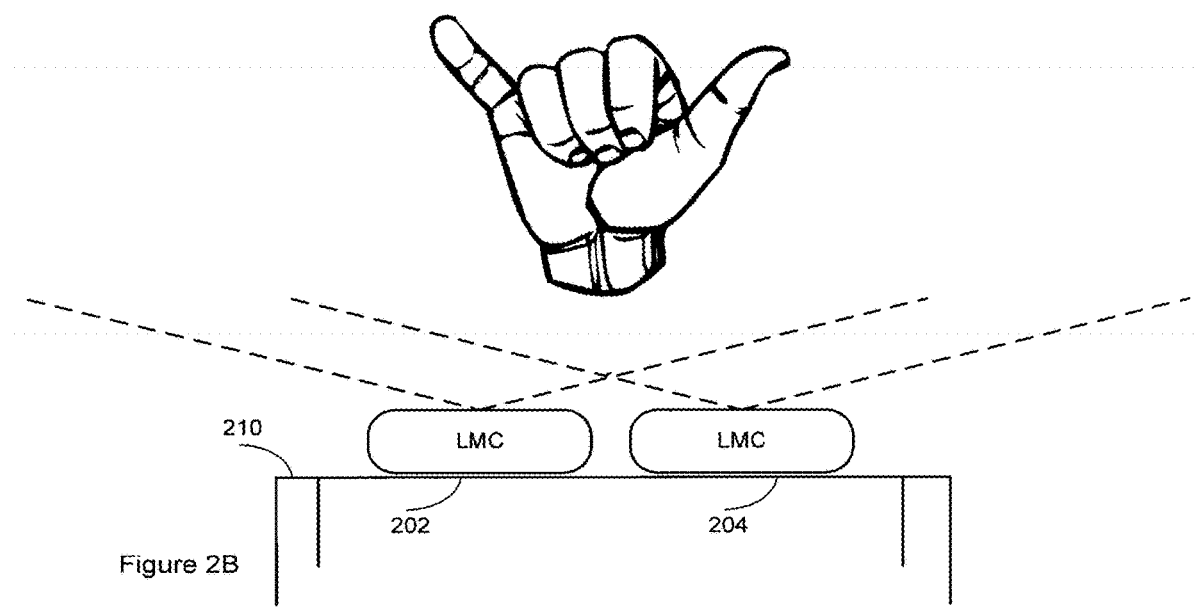
FIG. 2B is a proposed 2-sensor configuration and a generated detection environment within the sign language recognition system according to another exemplary embodiment.

FIGS. 2A and 2B illustrate a proposed 2-sensor configuration and a generated detection environment within the sign language recognition system 200 according to exemplary embodiments. In FIG. 2A, the sign language recognition system 200 includes 2 LMC devices 202. One benefit gained from using 2 LMC devices is to prevent the case of one finger being occluded by another finger or hand. LMC devices 202 and 204 can be arranged vertically across a space within a room so that a person can demonstrate sign language 206. Sign language 204 can be any sign language associated with world languages, including, for example, English, Arabic, Chinese, Korean, Russian, French, Italian, Spanish, German, Portuguese, Indian, etc. For purposes of illustration, Arabic sign language is illustrated.

The physical area or dimension covered by the 2 LMC devices 202 and 204 is the interaction space 208, where a person can stand or place their hand within the space 206 in order for the LMC devices 202 and 204 to detect and collect data.

FIG. 2B illustrates another configuration for the LMC devices 202 and 204. LMC devices 202 and 204 are placed on a desktop 210, which can be any type of flat surface, such as a desktop, table top, desk, chair, etc., facing upwards and allowing for sign language 206 to be performed right above the two LMC devices 202 and 204 and within the interaction space 208. Interaction space 208 can extend to a few meters away from LMC devices 202 and 204 and within an approximately 8 cubic foot area.

Figure 3:
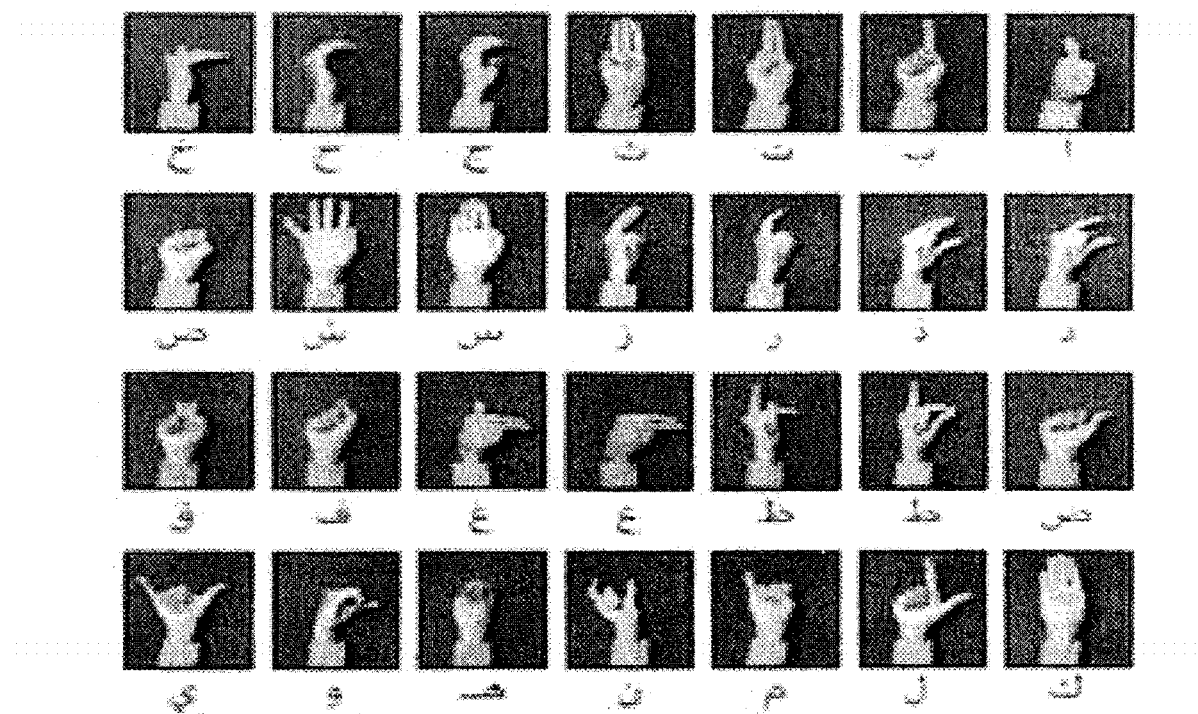
FIG. 3 is an illustration of Arabic alphabet signs according to an exemplary embodiment.

FIG. 3 is an illustration of Arabic alphabet signs according to an exemplary embodiment. The Arabic language includes a set of 28 alphabet signs which are illustrated in this figure. Each sign is distinctly different from the other. Arabic language is further unique in that it contains additional alphabetical characters and signs than other languages. For example, the English alphabet contains 26 letters, Russian alphabet contains 33 letters and so on. Various capturing and manipulations of data associated with Arabic alphabet signs will be described further in FIGS. 4-6.

Figure 4:
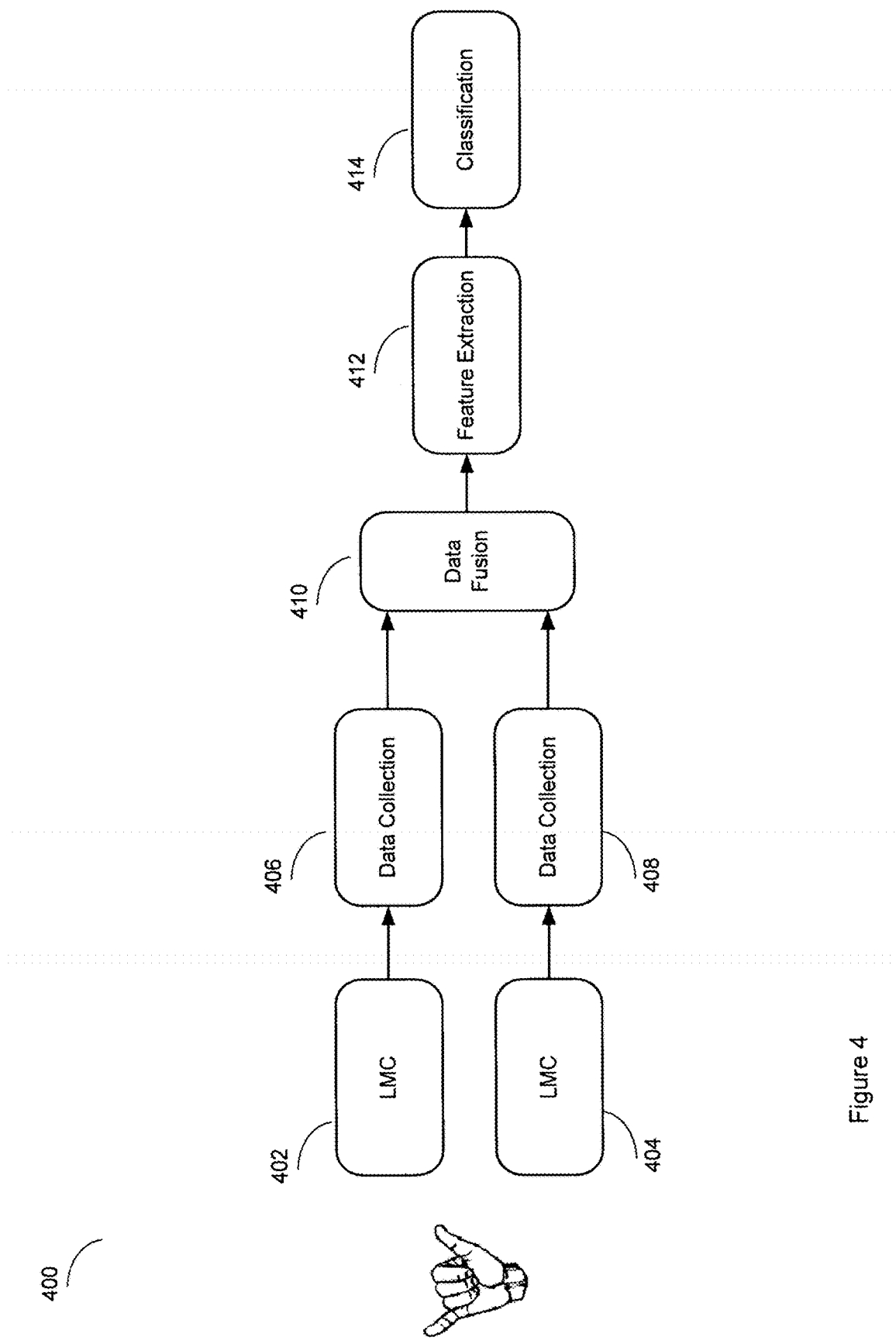
FIG. 4 is a sign language recognition system with data fusion performed at the sensor level according to an exemplary embodiment.

FIG. 4 is a sign language recognition system 400 with data fusion performed at the sensor level according to an exemplary embodiment. Sign language recognition system 400 includes at LMC device 402 and LMC device 404, data collection processors 406 and 408, data fusion 410, feature extraction 412 and classification 414. The twenty-eight Arabic alphabet signs (ي - ١) as shown in FIG. 3 are performed in front of the developed sign language recognition system 400. The two LMC devices 402 and 404 are placed at right angles to each other and the signs are performed within the interaction space of the two devices.

In one embodiment, Arabic alphabet signs are performed in a static manner and are performed using a single hand. As an initial phase, sign language recognition system 400 goes through training and testing phases. For training and testing of sign language recognition system 400, ten samples were collected for each letter and for each of LMC devices 402 and 404. Each sample includes 10 frames of data making a total of 100 frames per letter. Therefore, a total of 2800 frames of data are collected. The LMC's data acquisition/collection stage performed by circuits 406 and 408 returns twenty-three (23) features for each frame of data. To further focus the data acquisition/collection of the signs and to further increase accuracy of the sign language recognition system, 12 most relevant features were chosen and selected as features to be captured by the data acquisition/collection phase. These 12 features include: finger length, finger width, average tip position with respect to x, y, and z-axis, hand sphere radius, palm position with respect to x, y, and z-axis, hand pitch, roll and yaw. In one example, data is extracted from each LMC device 402 and 404 using the accompanying software program together with MATLAB™. Each LMC device 402 and 404 returns data representing the geometry detected objects around its vicinity. The data contains information describing the overall motion of the object.

A relevance metric is generated for the extracted features. The relevance metric is calculated by estimating the mean of each feature across the 10 frames of each sample.

Variations on the values of each feature related to the same letter are observed. This is due to the fact that usually people do not repeat a sign exactly the same way. Subsequently, this makes the classification process a challenging task and machine learning algorithms have to be used for better recognition. In one embodiment, the 12 features that were obtained from the two LMCs are concatenated to form a single (2800×24) vector which is fed to the feature extraction stage 412. Features are then extracted from the combined data.

The extracted features are transformed into a new set of features that are statistically uncorrelated. This is achieved using Singular Value Decomposition (SVD) of the estimated covariance matrix from the training set.

Figure 5:
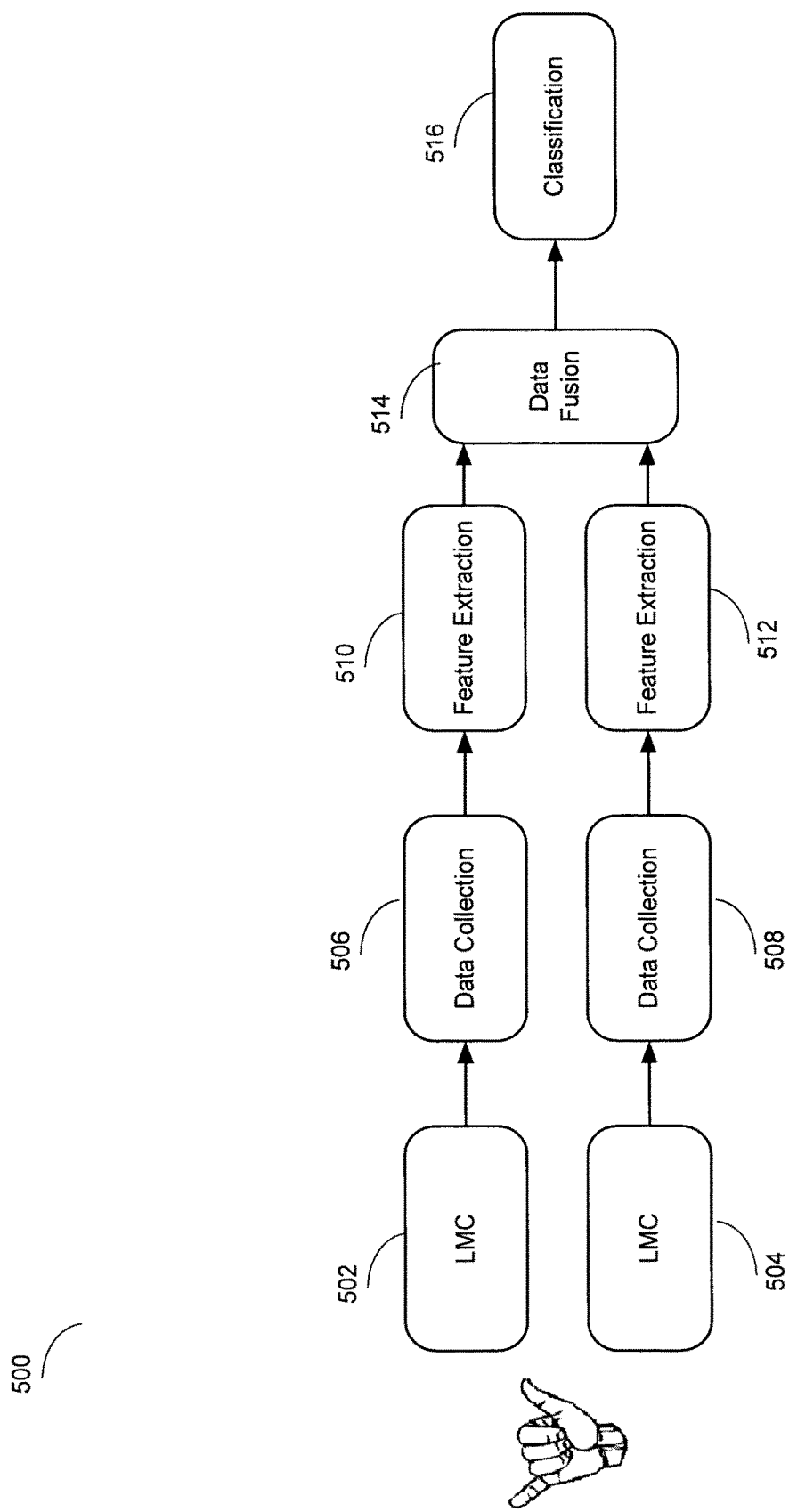
FIG. 5 is a sign language recognition system with data fusion performed at the feature extraction level according to an exemplary embodiment.

FIG. 5 is a sign language recognition system 500 with data fusion performed at the feature extraction level according to an exemplary embodiment. Sign language recognition system 500 includes at LMC device 502 and LMC device 504, data collection processors 506 and 508, feature extraction levels 510 and 512, data fusion level 514, and classification 512. The twenty-eight Arabic alphabet signs (ي - ١) as shown in FIG. 3 are performed in front of the developed sign language recognition system 500. The two LMC devices 502 and 504 are placed at right angles to each other and the signs are performed within the interaction space of the two devices. Data is collected at data collection stages 506 and 508 for each LMC respectively, and again, 23 features are returned for each frame of data. Out of the 23 features, 12 features are selected to increase efficiency and accuracy and are extracted at feature extraction level 510 and 512. In this embodiment, the data fusion 514 is performed at the feature extraction level in an aim to improve accuracy from data fusion at the data collection level described in FIG. 4. The combined decisions at the data fusion level 514 are then fed to classification level 516.

In one exemplary embodiment, a definition and storage layer (not shown) is included as part of generating the training matrix, which includes a hand gesture definition editor that allows users to define the Arabic hand gesture library. When the framework is in editing mode, a user can perform a hand gesture and a related feature vector is created. The framework allows users to repeat the gesture several times to obtain a more reliable vector.

Figure 6:
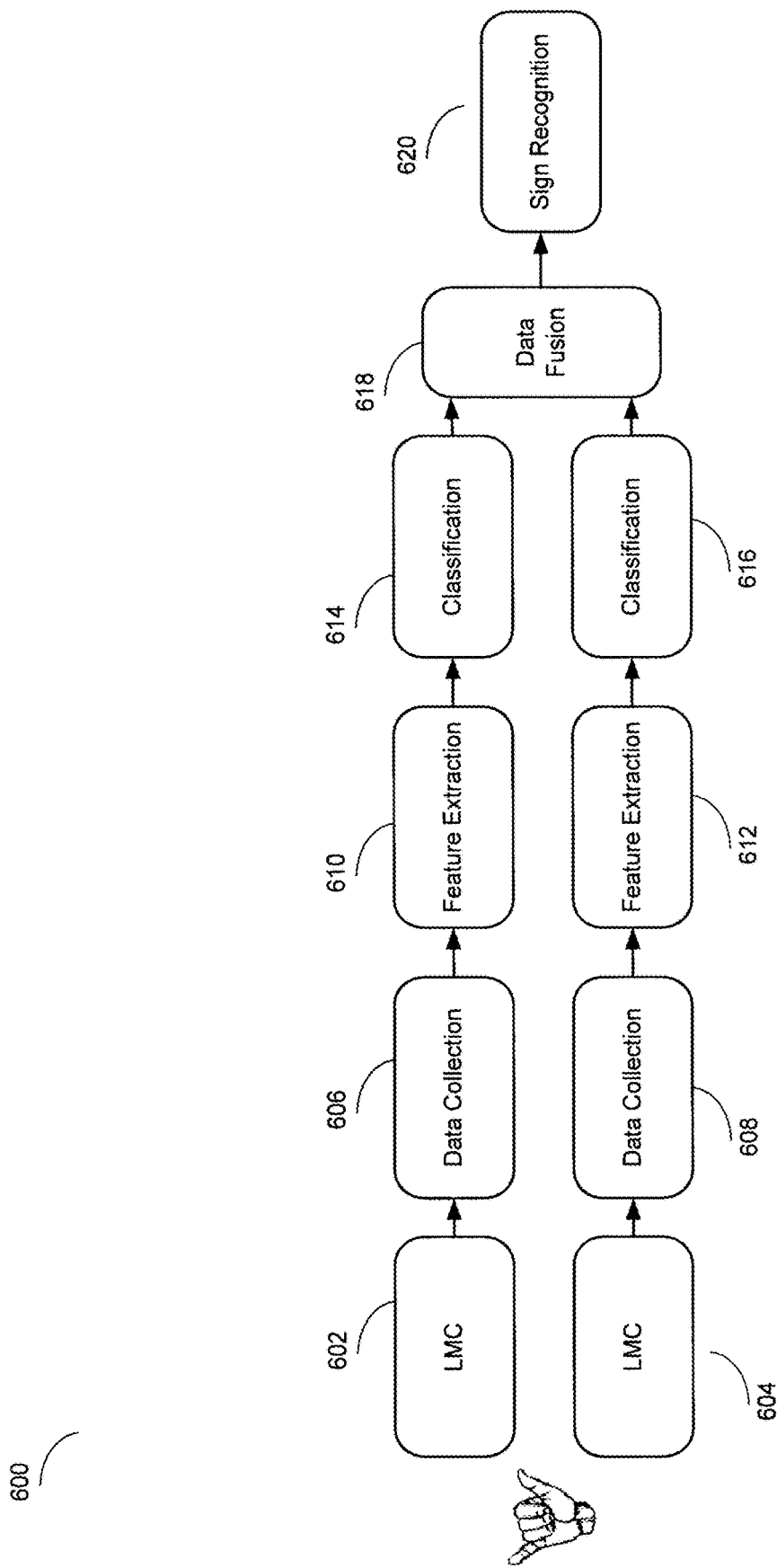
FIG. 6 is a sign language recognition system with data fusion performed at the classification level according to an exemplary embodiment.

FIG. 6 is a sign language recognition system 600 with data fusion performed at the classification level according to an exemplary embodiment. Sign language recognition system 600 includes at LMC device 602 and LMC device 604, data collection processors 606 and 608, feature extraction levels 610 and 612, data classification levels 614 and 616, data fusion level 618 and sign recognition output 620. The twenty-eight Arabic alphabet signs (ي - ١) as shown in FIG. 3 are performed in front of the developed sign language recognition system 600. The two LMC devices 602 and 604 are placed at right angles to each other and the signs are performed within the interaction space of the two devices. Data is collected at data collection stages 506 and 508 for each LMC respectively, and again, 23 features are returned for each frame of data. Out of the 23 features, 12 features are selected to increase efficiency and accuracy and are extracted at feature extraction level 610 and 612. In this embodiment, the data fusion 618 is performed at the data classification level in an aim to improve accuracy from data fusion at the data collection level described in FIG. 4.

The embodiment in FIG. 6 combines the decisions from more than one LMC based classifier into a single decision using the concept of evidence (Dempster-Shafer Theory) as further discussed herein.

Using the features discussed above, the performances of fusion at feature level and classifier level are compared using Linear Discriminant Analysis (LDA) classifier. In the case of classifier level fusion, Dempster-Shafer (DS) theory of evidence was used to combine the result obtained from the individual LDA classifier. A brief discussion of LDA classifier and DS theory of evidence is presented below.

Linear Discriminant Analysis (LDA)

Linear Discriminant analysis is used in statistics, pattern recognition and other machine learning techniques for dimensionality reduction and classification of patterns based on linear combination of features. LDA works by projecting high-dimensional data onto a low dimensional space where the data achieves maximum class separability. The resulting features in LDA are linear combinations of the original features, where the coefficients are obtained using a projection matrix W. The optimal projection is obtained by minimizing within-class-distance and maximizing between-class-distance simultaneously, thus achieving maximum class discrimination. The optimal projection is readily computed by solving a generalized eigenvalue problem.

More formally, for the available samples from the database, we define two measures: (i) within-class scatter matrix, given by:

$$S_w = \sum_{j=1}^{M} \sum_{i=1}^{N_j} (x_i^j - \mu_j)(x_i^j - \mu_j)^T \qquad (1)$$

Where $x_i^j$ (dimension n×1) is the $i^{th}$ sample vector of class j, $\mu_j$ is the mean of class j, M is the number of classes, and $N_j$ is the number of samples in class j.

The second measure (ii) is called between-class scatter matrix and is defined as:

$$S_b = \sum_{j=1}^{M} (\mu_j - \mu)(\mu_j - \mu)^T \quad (2)$$

Where $\mu$ is the mean vector of all classes.

The goal is to find a transformation W that maximizes the between-class measure while minimizing the within-class measure. One way to do this is to maximize the ratio $det(S_b)/det(S_w)$. The advantage of using this ratio is that if $S_w$ is a non-singular matrix then this ratio is maximized when the column vectors of the projection matrix, W, are the eigenvectors of $S_w^{-1}.S_b$. It should be noted that: (i) there are at most M-1 nonzero generalized eigenvectors, and so an upper bound on reduced dimension is M-1, and (ii) we require at least n (size of original feature vectors)+M samples to guarantee that $S_w$ does not become singular.

Dempster-Shafer (DS) Theory of Evidence

The block diagram in FIG. 6 shows the layout for fusion at classifiers level using DS theory of evidence.

There are three ways of combining classifier: abstract level, rank level and measurement level combination. The measurement level combination has confidence values assigned to each entry of the classifiers. This is the highest level of combination method as the confidence of a classifier gives the useful information which cannot be provided at the rank level or abstract level. A popularly used measurement level combination is the Dempster-Shafer (DS) theory of combination. In this work, we propose to use the DS theory to combine the evidences obtained from the two LMCs. The theory was introduced by Glenn Shafer and A. P Dempster as a generalization of Bayesian theory. It is popularly known as the theory of belief functions. Equation (3) always holds in the case of Bayesian theory.

$$P(A|C_1) + P(A|C_2) + \ldots + P(A|C_n) = 1 \quad (3)$$

The generalization of equation (3) obtained by DS is given as:

$$P(A|C_1) + P(A|C_2) + \ldots + P(A|C_n) + \theta = 1 \quad (4)$$

Where $\theta$ represents the uncertainty, hence, this technique is popularly used to model uncertainty. It works base on three concepts: basic belief assignment, belief function and plausibility.

The basic belief assignment (bba) is the basic of evidence theory. It assigns a value between 0 and 1 to all the variables in the subset (A) where both the bba of the null set is 0 and the summation of bba's of all the subsets should be equal to 1. Evidence is regarded to be certain if m(A)=1. The bba satisfies the following conditions $$0 \leq m(A) \leq 1 \quad (5)$$

$$m(\emptyset) = 0 \quad (6)$$

$$\sigma_{A \in P(x)} m(A) = 1 \quad (7)$$

Where P(X) is the power set of X and A is an element in the power set of X. The belief function assigns a value in the range [0, 1] to every non-empty subset B. Two bounds of interval can be defined for every probability assignment. The DS theory represents the lower bound by the belief func-tions. It is obtained from the sum of all the basic belief assignments of the proper subsets of B. The upper limit of the probability assignment is called the plausibility which is the sum of all the probability assignments of the sets B that intersect the set of interest (A).

$$Bel(A) = \Sigma_{B \subset A} m(B) \quad (8)$$

$$Pl(A) = \Sigma_{B \cap A \neq \emptyset} m(B) \quad (9)$$

Where Bel represents the belief function and Pl represents the plausibility function. A rule of combination which is expressed in equation (10) is used to combine all the evidences.

$$m_n(A) = \frac{\sum_{A_1 \cap A_2 \ldots \cap A_n} m_1(A_1) \times m_2(A_2) \times \ldots \times m_n(A_n)}{1 - \sum_{A_1 \cap A_2 \cap \ldots \cap A_n = \emptyset} m_1(A_1) \times m_2(A_2) \times \ldots \times m_n(A_n)} \quad (10)$$

Equation (10) shows the combination rule for n-evidences. Our system uses the DS theory of evidence to combine evidences obtained from the two LMCs at the classifier level.

Classification Results

Before classification process, the classifier is trained with part of the data. 75% of the data was used to train the classifier while 25% for testing the model. This was done using "leave one out" cross validation. Results obtained are in three categories. Classification results from individual LMCs result from fusion of features of the two LMCs device and results from fusion of classifiers using DS theory. Results of the three categories are summarized in table I.

TABLE I

LDA CLASSIFIER RESULTS

| Iteration | LMC 1 Using LDA | LMC 2 Using LDA | Feature combi-nation | D-S combi-nation |
|---|---|---|---|---|
| 1. | 93 | 89 | 97.2857 | 97.1429 |
| 2. | 93.42 | 90.42 | 97.5714 | 96.71 |
| 3. | 92 | 90.71 | 98.4286 | 97 |
| 4. | 93.28 | 88.28 | 98.4286 | 96.57 |
| 5. | 94.71 | 89.85 | 97.4286 | 96.85 |
| 6. | 93.57 | 91.42 | 96.4286 | 98 |
| 7. | 91.8 | 90.4 | 97.8571 | 96.28 |
| 8. | 93.0 | 89.71 | 98.2857 | 98.28 |
| 9. | 92.14 | 89.71 | 97.4286 | 97.42 |
| 10. | 93.85 | 89.57 | 97.7143 | 96.28 |
| Average | 93.08 | 89.91 | 97.69 | 97.05 |

From the 10 iteration performed, the first LMC gave an average of 93.077% accuracy, while the second give 89.907%. Combination of features from the two LMCs gave an average of 97.686% accuracy while classifier level fusion us DS theory gave 97.053%.

As can be seen from table I, classifier and feature level fusion of evidence gave an improved recognition perfor-mance of the ArSLR system as compared to the individual LMCs. Fusion at feature level misclassified 44 instances while classifier level fusion misclassified 80 instances out of 2800 total instances. Some of the misclassified letters are shown table II and III below.

TABLE II

SOME OF THE MISCLASSIFIED LETTERS FROM FEATURE FUSION

| Actual letter | Misclassified as | Number of times |
|---|---|---|
| أ | ع | 8 |
| ح | ق | 8 |
| ح | خ | 4 |
| ع | ل | 4 |
| ص | ض | 4 |

TABLE III

SOME OF THE MISCLASSIFIED LETTERS FROM CLASSIFIER FUSION

| Actual letter | Misclassified as | Number of times |
|---|---|---|
| أ | ع | 4 |
| ط | ب | 8 |
| ض ج | ص | 12 |
| ح | م | 8 |
| ب | ق | 4 |

By analyzing the misclassified signs we notice that most of the misclassified signs are similar to the signs they are classified to. However, the results show an improvement over using a single LMC unit.

Figure 7:
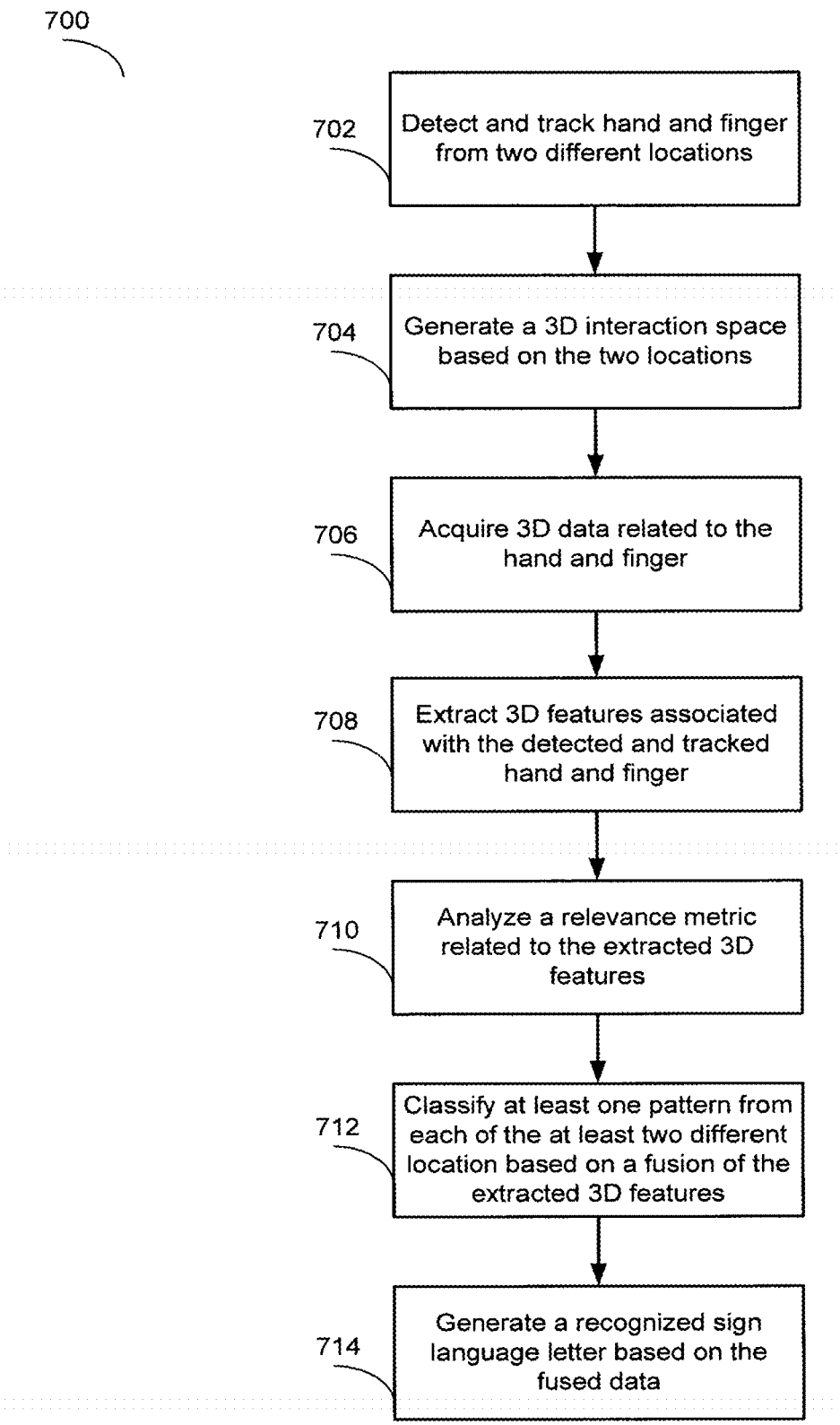
FIG. 7 is an algorithmic flow chart of a sign language recognition method to according to an exemplary embodiment.

FIG. 7 is an algorithmic flow chart of a sign language recognition method to according to an exemplary embodiment. The method includes an initial step 702 to detect and track hands and fingers from two different locations. The hand and fingers are tracked and detected when they enter a field of view of a sensor device. One exemplary sensor device used is the LMC device such that two LMC devices are deployed within a given location, such as a room or a table top to generate 704, a 3 dimensional (3D) interaction space based on the two LMCs. The method further includes acquiring, 706, 3D data related to the hand and finger objects that have been detected in the interaction space and extract, 708, 3D features associated with the detected and tracked hand and finger. Additionally, the method further includes analyzing, 710, a relevance metric related to the extracted 3D features and classifying, 712, at least one pattern from each of the at least two different locations based on a fusion of the extracted 3D features. Fusion may occur at different levels, including data fusion at sensor level, feature fusion at feature level or fusion at the classification level. Thereafter, the method further includes generating, 714, a recognized sign language letter based on the fused data. Once a letter is generated, a matrix or database may be generated of the recognized sign language letters. Once the matrix is generated, a word including several recognized letters may be further output. For example, if the letters generated are "H", "O", and "W", they are placed in a matrix in the order they are generated respectively and then output as a formed word. As such, the word "how" may be output. It is also worth noting that this example is used for illustration purposes and is not meant to be limiting. As such, the received letter may be an Arabic letter and thus, an Arabic word or a word in other languages may be further output.

Figure 8:
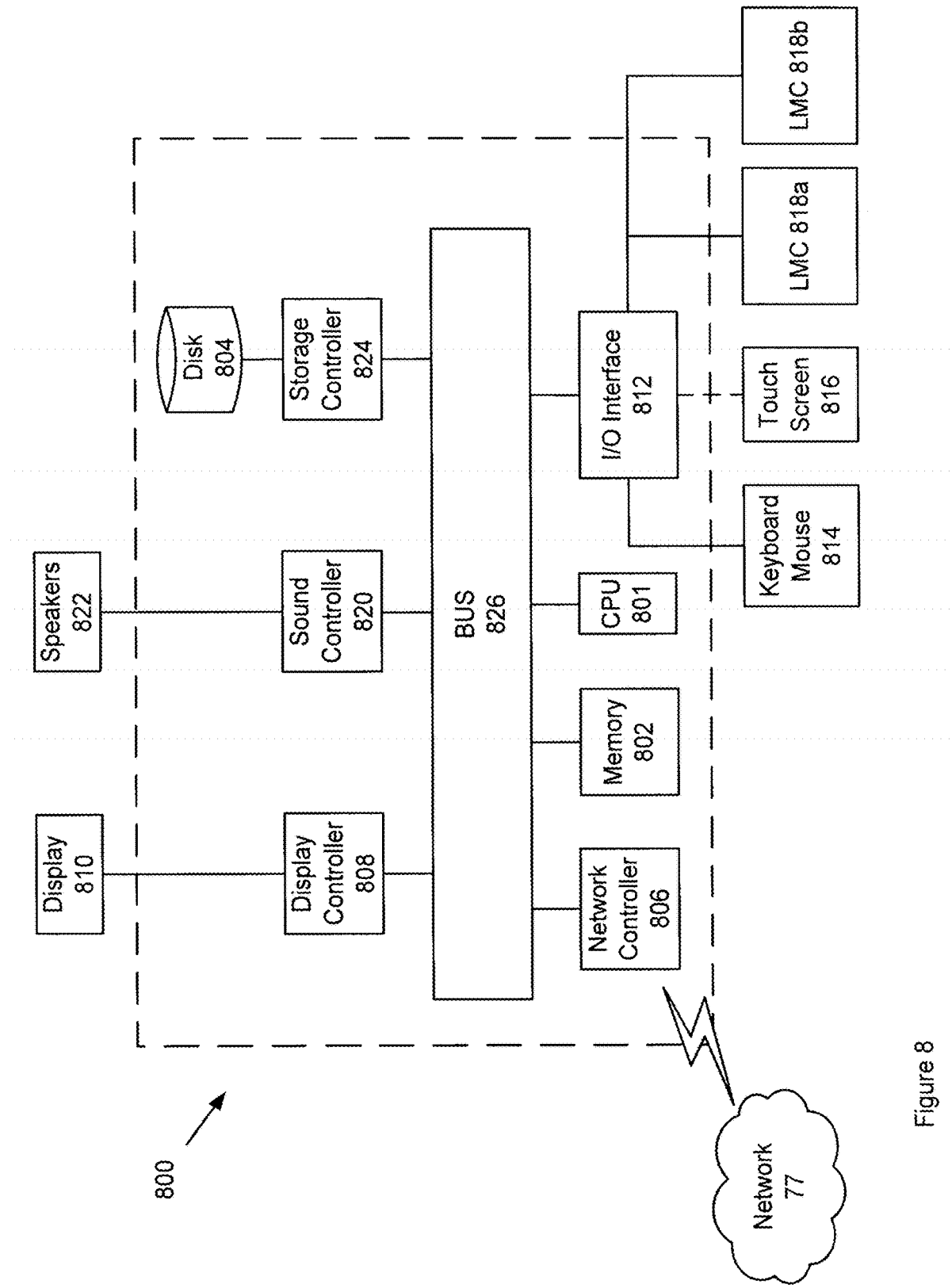
FIG. 8 is an illustration of hardware diagram device according to exemplary embodiments.

FIG. 8 an illustration of a hardware description of a system according to embodiments illustrated in FIGS. 1-7.

Next, a hardware description of a system 800 according to exemplary embodiments illustrated in FIGS. 1-7 is described with reference to FIG. 8. In FIG. 8, the device includes a CPU 801, or processing circuit, which performs the processes described above. The process data and instructions may be stored in memory 802. These processes and instructions may also be stored on a storage medium disk 804 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the device communicates, such as a server or computer.

Further, the present advancements may be provided as a utility application, background daemon, or component of an operating system, or combination thereof, executing in conjunction with CPU 801 and an operating system such as Microsoft Windows 7, UNIX, Solaris, LINUX, Apple MAC-OS and other systems known to those skilled in the art.

CPU 801 may be a Xenon or Core processor from Intel of America or an Opteron processor from AMD of America, or may be other processor types that would be recognized by one of ordinary skill in the art. Alternatively, the CPU 801 may be implemented on an FPGA, ASIC, PLD or using discrete logic circuits, as one of ordinary skill in the art would recognize. Further, CPU 801 may be implemented as multiple processors cooperatively working in parallel to perform the instructions of the inventive processes described above.

The system in FIG. 8 also includes a network controller 806, such as an Intel Ethernet PRO network interface card from Intel Corporation of America, for interfacing with network 77. As can be appreciated, the network 77 can be a public network, such as the Internet, or a private network such as an LAN or WAN network, or any combination thereof and can also include PSTN or ISDN sub-networks. The network 77 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The device further includes a display controller 808, such as a NVIDIA GeForce GTX or Quadro graphics adaptor from NVIDIA Corporation of America for interfacing with display 810, such as a Hewlett Packard HPL2445w LCD monitor. A general purpose I/O interface 812 interfaces with a keyboard and/or mouse 814 as well as a touch screen panel 816 on or separate from display 810. General purpose I/O interface also connects to a variety of peripherals, including the 2 LMC devices 818a and 818b.

A sound controller 820 is also provided in the device, such as Sound Blaster X-Fi Titanium from Creative, to interface with speakers/microphone 822 thereby providing sounds and/or music.

The general purpose storage controller 824 connects the storage medium disk 804 with communication bus 826, which may be an ISA, EISA, VESA, PCI, or similar, for interconnecting all of the components of the device. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

A system for Arabic alphabet sign recognition using the newly introduced leap motion controller (LMC) is developed. Two LMCs are placed perpendicular to each other to acquire the signs data. This system releases the users from wearing a cumbersome electronic gloves or performing the signs under restrictive environmental conditions by using the two already utilized methods. Ten samples of each of the 28 Arabic alphabet signs aree collected from a single signer using the two LMCs. Ten frames are acquired from each sample letter sign, to provide a total of 2,800 frames of data. Twelve features are selected from 23 values provided by the LMC for the representations of each frame in the coverage area of the LMC. For classification embodiments compared the fusion of evidence from the two LMCs at features and classifiers levels. Better accuracy was observed for both cases of fusion as compared to individual classification results obtained from the LMCs separately. The average accuracy (with fusion at features level) of the signs recognition using the LDA classifier is about 97.7% while the accuracy at classifier fusion using DS theory is about 97.1%. Analysis of the misclassified signs (44 for feature level fusion and 80 for classifier level fusion out of 2,800 frames) reveal that most of the misclassified letter signs are similar to the signs they are classified to.

Thus, the foregoing description is organized as exemplary embodiments only for clarity. The features of one embodiment may, however, be incorporated into another without limitation. Thus, features will be understood by those skilled in the art, the present disclosure may be embodied in other specific forms without departing from the spirit or essential characteristics thereof and aspects of the exemplary embodiments described herein may be combined differently to form additional embodiments or omitted. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

The invention claimed is:

1. A method for sign language recognition comprising:
   detecting and tracking at least one hand and at least one finger of the at least one hand from at least two different locations in a room by at least two different sensor circuitry;
   generating a 3-dimensional (3D) interaction space based on the at least two different Leap Motion Controllers (LMC) each comprising a plurality of IR cameras and a plurality of IR LEDs;
   acquiring 3D data related to the at least one detected and tracked hand and the at least one detected and tracked finger;
   extracting 3D features associated with the at least one detected and tracked hand and the at least one detected and tracked finger;
   analyzing, by processing circuitry a relevance metric related to the extracted 3D features;
   classifying, by an analysis classifier circuitry, at least one pattern from each of the at least two different locations based on a fusion of data outputs by the classifying circuitry;
   generating a recognized Arabic alphabet sign language letter based on the fusion of the data outputs;
   generating a matrix of recognized sign language letters; and
   outputting at least one word based on the generated matrix of recognized sign language letters.

2. The method of Claim 1, wherein 28 Arabic alphabet signs are performed in the interaction space.

3. The method of claim 2, wherein acquiring data further comprises collecting ten samples for each letter and for each LMC, wherein each sample includes ten captured frames of data for each of the at least one detected and tracked hand and the at least one detected and tracked finger.

4. The method of claim 3, wherein the extracted features associated with the at least one detected and tracked hand and the at least one detected and tracked finger include finger length, finger width, average tip position with respect to x, y, and z-axis of the 3D interactive space, hand sphere radius, palm position with respect to x, y and z-axis of the 3D interactive space, hand pitch, roll and yaw.

5. The method of claim 3, wherein the relevance metric includes estimating a mean of each feature across the ten frames of each sample.

6. The method of claim 1, wherein the data fusion output is performed at the data acquisition level.

7. The method of claim 1, wherein the data fusion output is performed at the feature extraction level.

8. The method of claim 3, wherein the data fusion output is performed at the classification level.

9. The method of claim 8, wherein output for each LMC is fed into a Linear Discriminant Analysis (LDA) classifier circuitry.

10. The method of claim 9, wherein output data for each LDA classifier circuitry is combined using a Dempster-Shafer theory of combination applied at a measurement level combination.

11. A system for sign language recognition comprising:
    at least two Leap Motion Controllers (LMC) each comprising a plurality of IR cameras and a plurality of IR LEDs; and
    circuitry configured to
    detect and track, with the LMCs, at least one hand and at least one finger of the at least one hand from at least two different locations in a room,
    generate a 3-dimensional (3D) interaction space based on the at least two different locations,
    acquire 3D data related to the at least one detected and tracked hand and the at least one detected and tracked finger,
    extract 3D features associated with the at least one detected and tracked hand and the at least one detected and tracked finger,
    analyze a relevance metric related to the extracted 3D features,
    classify at least one pattern from each of the at least two different locations based on a fusion of data outputs by the circuitry,
    generate a recognized Arabic alphabet sign language letter based on the fusion of the data outputs;
    generate a matrix of recognized sign language letters, and
    output at least one word based on the generated matrix of recognized sign language letters.

12. The system of Claim 11, wherein 28 Arabic alphabet signs are performed in the interaction space.

13. The system of claim 12, wherein the circuitry is further configured to:
    collect ten samples for each letter and for each LMC, wherein each sample includes ten captured frames of data for each of the at least one detected and tracked hand and the at least one detected and tracked finger.

14. The system of claim 13, wherein the extracted features associated with the at least one detected and tracked hand and the at least one detected and tracked finger include finger length, finger width, average tip position with respect to x, y, and z-axis of the 3D interactive space, hand sphere radius, palm position with respect to x, y and z-axis of the 3D interactive space, hand pitch, roll and yaw.

15. The system of claim 11, wherein the relevance metric includes estimating a mean of each feature across the ten frames of each sample.

16. The system of claim 15, wherein output for each LMC is fed into a Linear Discriminant Analysis (LDA) classifiers circuitry.

17. The system of claim 16, wherein output data for each lda classifier circuitry is combined using a dempster-shafer theory of combination applied at a measurement level combination.

* * * * *